(12) United States Patent
Takamoto et al.

(10) Patent No.: US 10,626,273 B2
(45) Date of Patent: Apr. 21, 2020

(54) RESIN COMPOSITION AND MOLDED ARTICLE THEREOF

(71) Applicant: TORAY Industries, Inc., Tokyo (JP)

(72) Inventors: Tatsuya Takamoto, Nagoya (JP); Keiichiro Nomura, Nagoya (JP); Nobuhiro Morioka, Nagoya (JP); Sadayuki Kobayashi, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 16/306,684

(22) PCT Filed: Aug. 3, 2017

(86) PCT No.: PCT/JP2017/028242
§ 371 (c)(1),
(2) Date: Dec. 3, 2018

(87) PCT Pub. No.: WO2018/043025
PCT Pub. Date: Mar. 8, 2018

(65) Prior Publication Data
US 2019/0309164 A1 Oct. 10, 2019

(30) Foreign Application Priority Data

Aug. 31, 2016 (JP) .................................. 2016-169141
Nov. 30, 2016 (JP) .................................. 2016-232445

(51) Int. Cl.
| | | |
|---|---|---|
| C08L 67/00 | (2006.01) | |
| C08L 77/00 | (2006.01) | |
| C08L 77/02 | (2006.01) | |
| C08L 67/02 | (2006.01) | |
| C08L 77/06 | (2006.01) | |
| C08K 7/02 | (2006.01) | |
| C08L 71/02 | (2006.01) | |
| C08L 101/12 | (2006.01) | |

(52) U.S. Cl.
CPC ............... *C08L 77/02* (2013.01); *C08K 7/02* (2013.01); *C08L 67/02* (2013.01); *C08L 71/02* (2013.01); *C08L 77/06* (2013.01); *C08L 101/12* (2013.01)

(58) Field of Classification Search
CPC ........... C08L 63/00; C08L 67/00; C08L 77/00
See application file for complete search history.

(56) References Cited

U.S. PATENT DOCUMENTS

| | | | | |
|---|---|---|---|---|
| 8,497,320 | B2* | 7/2013 | Ruslim | ............... C08B 37/0015 |
| | | | | 525/54.26 |
| 9,468,092 | B2* | 10/2016 | Sawada | ...................... B32B 5/02 |
| 9,884,969 | B2* | 2/2018 | Kim | ...................... C08L 101/005 |
| 10,113,061 | B2* | 10/2018 | Nishioka | .................. C08L 67/04 |
| 10,119,024 | B2* | 11/2018 | Nomura | .................. C08L 77/02 |
| 10,273,364 | B2* | 4/2019 | Nakai | ...................... C08L 71/02 |
| 2014/0342531 | A1* | 11/2014 | Tominaga | ............... C09J 201/02 |
| | | | | 438/464 |
| 2015/0200039 | A1* | 7/2015 | Taguchi | ................... C08L 21/00 |
| | | | | 310/363 |
| 2016/0157343 | A1* | 6/2016 | Abe | ...................... H05K 1/0283 |
| | | | | 361/749 |
| 2016/0340485 | A1* | 11/2016 | Nomura | ...................... C08J 5/24 |
| 2017/0002154 | A1* | 1/2017 | Hiasa | .......................... C08J 5/06 |
| 2017/0198138 | A1 | 7/2017 | Nishioka et al. | |
| 2017/0260346 | A1 | 9/2017 | Hirata et al. | |
| 2017/0335104 | A1 | 11/2017 | Nomura et al. | |

FOREIGN PATENT DOCUMENTS

| | | | |
|---|---|---|---|
| JP | 6-100774 A | 4/1994 | |
| JP | 2008-1997 A | 1/2008 | |
| JP | 2010-209247 A | 9/2010 | |
| JP | 2010-260889 A | 11/2010 | |
| JP | 2011-195615 A | 10/2011 | |
| JP | 2013-149715 A | 8/2013 | |
| JP | 2016-56308 A | 4/2016 | |
| WO | WO 2015/129513 A1 | 9/2015 | |
| WO | WO 2016/031664 A1 | 3/2016 | |
| WO | WO-2016031664 A1 * | 3/2016 | .............. C08L 67/04 |
| WO | WO 2016084345 A1 * | 6/2016 | .............. H05K 1/02 |
| WO | WO 2016/167247 A1 | 10/2016 | |
| WO | WO-2016167241 A1 * | 10/2016 | .............. C08L 77/00 |

OTHER PUBLICATIONS

International Search Report, issued in PCT/JP2017/028242, PCT/ISA/210, dated Oct. 17, 2017.
Written Opinion of the International Searching Authority, issued in PCT/JP2017/028242, PCT/ISA/237, dated Oct. 17, 2017.

* cited by examiner

Primary Examiner — Rip A Lee
(74) Attorney, Agent, or Firm — Birch, Stewart, Kolasch & Birch, LLP

(57) ABSTRACT

Disclosed is a resin composition including a thermoplastic resin (A) and a polyrotaxane (B) whose cyclic molecule is modified with a graft chain having a reactive functional group at the end, which are mixed together, the resin composition containing a fibrous filler (C) in the amount of 1 to 200 parts by weight relative to 100 parts by weight of the total amount of the thermoplastic resin (A) and the polyrotaxane (B). To provide a resin composition capable of affording a molded article having excellent balance between rigidity and toughness.

4 Claims, No Drawings

RESIN COMPOSITION AND MOLDED ARTICLE THEREOF

TECHNICAL FIELD

The present invention relates to a resin composition obtained by mixing a thermoplastic resin, a polyrotaxane whose cyclic molecule is modified and a fibrous filler, and a molded article thereof.

BACKGROUND ART

A fiber-reinforced plastic is composed of a thermosetting resin such as an unsaturated polyester resin or an epoxy resin or a thermoplastic resin such as polyamide or polyphenylene sulfide (PPS) and a fibrous filler such as a carbon fiber or a glass fiber, and is lightweight and has excellent mechanical properties, and thus the fiber-reinforced plastic has widely been used in sporting goods applications, aerospace applications and general industrial applications.

There have been made many proposals of adding a glass fiber for the purpose of improving the rigidity of plastics (see, for example, Patent Literature 1). However, these fiber-reinforced plastics may be fractured to expose a sharp fracture surface, leading to scattering of fractured pieces to the surroundings. There is a risk of users getting hurt by such sharp fracture surface due to brittle fracture, thus causing a problem such as limitation of applications.

Thus, there has been proposed a fiber-reinforced polyamide in which a modified elastomer is added for the purpose of improving the toughness of fiber-reinforced plastics (see, for example, Patent Literature 2).

CITATION LIST

Patent Literature

[Patent Literature 1]
Japanese Unexamined Patent Publication (Kokai) No. 6-100774
[Patent Literature 2]
Japanese Unexamined Patent Publication (Kokai) No. 2010-209247

SUMMARY OF INVENTION

Technical Problem

However, it was impossible for the prior art to obtain a fiber-reinforced plastic material that exhibits ductile fracture morphology while maintaining high rigidity. In the light of the above problems of the present invention, an object of the present invention is to provide a resin composition capable of affording a molded article having excellent balance between rigidity and toughness.

Solution to Problem

To solve the problems mentioned above, the present invention has the following structure.

A resin composition including a thermoplastic resin (A), a polyrotaxane (B) whose cyclic molecule is modified with a graft chain having a reactive functional group at the end, and a fibrous filler (C), which are mixed together, the resin composition containing the fibrous filler (C) in the amount of 1 to 200 parts by weight relative to 100 parts by weight of the total amount of the thermoplastic resin (A) and the polyrotaxane (B).

A molded article including the resin composition mentioned above.

Advantageous Effects of Invention

According to the resin composition of the present invention, it is possible to afford a molded article having excellent balance between rigidity and toughness.

DESCRIPTION OF EMBODIMENTS

The present invention will be described in more detail below.

The resin composition of the present invention is obtained by mixing a thermoplastic resin (A), a polyrotaxane (B) whose cyclic molecule is modified with a graft chain having a reactive functional group at the end, and a fibrous filler (C). Mixing of the thermoplastic resin (A) enables an improvement in rigidity and heat resistance. Mixing of the polyrotaxane (B) enables an improvement in toughness. Mixing of the fibrous filler (C) enables a great improvement in rigidity and dimensional stability. Mixing of the thermoplastic resin (A), the polyrotaxane (B), and the fibrous filler (C) enables an improvement in toughness while maintaining the rigidity.

The thermoplastic resin (A) is not particularly limited as long as it is a resin that exhibits thermoplasticity and includes, for example, styrene-based resin, fluororesin, polyoxymethylene, polyamide, polyester, polyimide, polyamideimide, vinyl chloride, olefin-based resin, polyacrylate, polyphenylene ether, polycarbonate, polyethersulfone, polyetherimide, polyetherketone, polyether ether ketone, polyarylene sulfide, cellulose derivatives, liquid crystalline resin, and modified resins thereof. Two or more thermoplastic resins may be included.

The styrene-based resin includes, for example, PS (polystyrene), HIPS (high impact polystyrene), AS (acrylonitrile/styrene copolymer), AES (acrylonitrile/ethylene-propylene-nonconjugated diene rubber/styrene copolymer), ABS (acrylonitrile/butadiene/styrene copolymer), MBS (methyl methacrylate/butadiene/styrene copolymer) and the like. As used herein, the symbol "/" means a copolymer, and the same shall apply hereinafter. Two or more styrene-based resins may be included. Of these styrene-based resins, ABS is particularly preferable.

Specific examples of the polyamide include polycaproamide (nylon 6), poly(hexamethylene adipamide) (nylon 66), poly(pentamethylene adipamide) (nylon 56), poly(tetramethylene adipamide) (nylon 46), poly(hexamethylene sebacamide) (nylon 610), poly(hexamethylene dodecanamide) (nylon 612), polyundecaneamide (nylon 11), polydodecaneamide (nylon 12), polycaproamide/poly(hexamethylene adipamide) copolymer (nylon 6/66), polycaproamide/poly(hexamethylene terephthalamide) copolymer (nylon 6/6T), poly(hexamethylene adipamide)/poly(hexamethylene isophthalamide) copolymer (nylon 66/6I); poly(hexamethylene terephthalamide)/poly(hexamethylene isophthalamide) copolymer (nylon 6T/6I), poly(hexamethylene terephthalamide)/polydodecaneamide copolymer (nylon 6T/12), poly(hexamethylene adipamide)/poly(hexamethylene terephthalamide)/poly(hexamethylene isophthalamide) copolymer (nylon 66/6T/6I), poly(xylylene adipamide) (nylon XD6), poly(hexamethylene terephthalamide)/poly(2-methylpentamethylene terephthalamide) copolymer (nylon 6T/M5T), poly(nonamethylene terephthalamide) (nylon 9T), and copolymers thereof. Two or more polyamides may be included.

There is no particular limitation on the polymerization degree of the polyamide, and a relative viscosity measured in a 98% concentrated sulfuric acid solution having a resin concentration of 0.01 g/ml at 25° C. is preferably within a range of 1.5 to 7.0, and more preferably 2.2 to 4.0.

The olefin-based resin includes, for example, polypropylene, polyethylene, an ethylene/propylene copolymer, an ethylene/1-butene copolymer, an ethylene/propylene/non-conjugated diene copolymer, an ethylene/ethyl acrylate copolymer, an ethylene/glycidyl methacrylate copolymer, an ethylene/vinyl acetate/glycidyl methacrylate copolymer, a propylene-g-maleic anhydride copolymer, an ethylene/propylene-g-maleic anhydride copolymer, a methacrylic acid/methyl methacrylate/glutaric anhydride copolymer and the like. Two or more olefin-based resins may be included.

The polyester is preferably a polymer or copolymer that includes residues of a dicarboxylic acid or an ester-forming derivative thereof and a diol or an ester-forming derivative thereof as main structural units. Of these polyesters, aromatic polyesters such as polyethylene terephthalate, polypropylene terephthalate, polybutylene terephthalate, polycyclohexanedimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, and polybutylene terephthalate/naphthalate are particularly preferable, and polybutylene terephthalate is most preferable. Two or more polyesters may be included. In these polyesters, a proportion of a terephthalic acid residue is preferably 30 mol % or more, and more preferably 40 mol % or more, relative to the whole dicarboxylic acid residues.

The polyester may include one or more residues selected from a hydroxycarboxylic acid or an ester-forming derivative thereof and a lactone. The hydroxycarboxylic acid includes, for example, glycolic acid, lactic acid, hydroxypropionic acid, hydroxybutyric acid, hydroxyvaleric acid, hydroxycaproic acid, o-hydroxybenzoic acid, m-hydroxybenzoic acid, p-hydroxybenzoic acid, 6-hydroxy-2-naphthoic acid and the like. The lactone includes, for example, caprolactone, valerolactone, propiolactone, undecalactone, 1,5-oxepan-2-one and the like. The polymer or copolymer including these residues as the structural units includes, for example, aliphatic polyester resins such as polyglycolic acid, polylactic acid, polyglycolic acid/lactic acid, polyhydroxybutyric acid/β-hydroxybutyric acid/β-hydroxyvaleric acid and the like.

A melting point of the polyester is not particularly limited and is preferably 120° C. or higher, and more preferably 220° C. or higher, in view of the heat resistance. The upper limit is not particularly limited and is preferably 300° C. or lower, and more preferably 280° C. or lower. The melting point is determined by the following procedure using a differential scanning calorimeter (DSC). In an inert gas atmosphere, the temperature of a polyester is decreased to 30° C. from a molten state at a temperature decrease rate of 20° C./minute and the temperature is increased at a temperature rise rate of 20° C./minute, and then the temperature of an endothermic peak observed is defined as the melting point. The temperature is preferably increased to the melting point+40° C.

An amount of the carboxyl end group of the polyester is not particularly limited and is preferably 50 eq/t or less, and more preferably 10 eq/t or less, in view of the fluidity, hydrolysis resistance and heat resistance. The lower limit is 0 eq/t. The amount of the carboxyl end group of the polyester is a value obtained by measuring after dissolving a polyester resin in an o-cresol/chloroform (2/1, vol/vol) solvent and titrating with a 0.05 mol/L potassium hydroxide ethanolic solution using 1% bromophenol blue as an indicator.

An intrinsic viscosity of the polyester is not particularly limited as long as melt kneading can be performed. In view of the moldability, the intrinsic viscosity measured at 25° C. in an o-chlorophenol solution having the concentration adjusted to 0.5% by weight is preferably within a range of 0.36 to 1.60 dl/g, more preferably 0.50 to 1.25 dl/g, and still more preferably 0.7 to 1.0 dl/g.

A molecular weight of the polyester is not particularly limited. In view of the heat resistance, the weight average molecular weight, (Mw) is preferably within a range of 50,000 to 500,000, and more preferably 150,000 to 250,000. In the present invention, the weight average molecular weight (Mw) of the polyester is a relative value relative to a molecular weight of standard polymethyl methacrylate measured by gel permeation chromatography (GPC).

A method for producing a polyester is not particularly limited and examples thereof include a known polycondensation method, a known ring-opening polymerization method and the like. The method may be performed by either batch polymerization or continuous polymerization, and it is possible to apply either the transesterification reaction or the reaction by direct polymerization.

A polycarbonate can be obtained by a phosgene method in which phosgene is blown into a bifunctional phenol-based compound in the presence of a caustic alkali and a solvent, a transesterification method in which a bifunctional phenol-based compound is transesterified with diethyl carbonate in the presence of a catalyst and the like. Examples of the polycarbonate include aromatic homopolycarbonate, aromatic copolycarbonate and the like. A viscosity average molecular weight of these aromatic polycarbonates is preferably within a range of 10,000 to 100,000.

The bifunctional phenol-based compound includes, for example, 2,2'-bis(4-hydroxyphenyl) propane, 2,2'-bis(4-hydroxy-3,5-dimethylphenyl) propane, bis(4-hydroxyphenyl) methane, 1,1'-bis(4-hydroxyphenyl) ethane, 2,2'-bis(4-hydroxyphenyl) butane, 2,2'-bis(4-hydroxy-3,5-diphenyl) butane, 2,2'-bis(4-hydroxy-3,5-dipropylphenyl) propane, 1,1'-bis(4-hydroxyphenyl)cyclohexane, 1-phenyl-1,1'-bis(4-hydroxyphenyl)ethane and the like. Two or more bifunctional phenol-based compounds may be used.

The polyarylene sulfide includes, for example, polyphenylene sulfide (PPS), polyphenylene sulfide sulfone, polyphenylene sulfide ketone, random copolymers and block copolymers thereof and the like. Two or more polyarylene sulfides may be used.

The polyarylene sulfide can be produced by usually known methods such as a method for obtaining a polymer having comparatively small molecular weight mentioned in Japanese Examined Patent Publication (Kokoku) No. 45-3368 and a method for obtaining a polymer having comparatively large molecular weight mentioned in Japanese Examined Patent Publication (Kokoku) No. 52-12240 or Japanese Unexamined Patent Publication (Kokai) No 61-7332. It is of course possible to use after subjecting the obtained polyarylene sulfide to various treatments such as crosslinking/increasing its molecular weight by heating, heat treatment in an atmosphere of an inert gas such as nitrogen or under reduced pressure, cleaning with an organic solvent, hot water, or an acid aqueous solution, and activation with acid anhydride, amine, isocyanate, or a functional group-containing compound such as a functional group-containing disulfide compound.

Specific method for performing crosslinking/increasing its molecular weight by heating of the polyarylene sulfide includes a method in which heating is performed in an atmosphere of an oxidizing gas such as air or oxygen, or an atmosphere of a mixed gas of the oxidizing gas and an inert gas such as nitrogen or argon in a heating vessel at a predetermined temperature until the expected melt viscosity can be obtained. The heat treatment temperature is preferably within a range of 200 to 270° C. and the heat treatment time is preferably within a range of 2 to 50 hours. From the viewpoint of performing a heat treatment efficiently and more uniformly, it is preferred that heating is performed in a rotary heating vessel or a heating vessel equipped with a stirring blade. Specific method for performing a heat treatment of the polyarylene sulfide in an atmosphere of an inert gas such as nitrogen or under reduced pressure includes a method in which a heat treatment is performed in an atmosphere of an inert gas such as nitrogen or under reduced pressure (preferably 7,000 $Nm^{-2}$ or less) under the conditions of the heat treatment temperature of 200 to 270° C. and the heat treatment time of 2 to 50 hours. From the viewpoint of performing a heat treatment efficiently and more uniformly, it is preferred that heating is performed in a rotary heating vessel or a heating vessel equipped with a stirring blade. When the polyarylene sulfide is cleaned with an organic solvent, N-methylpyrrolidone, acetone, dimethylformamide and chloroform and the like are preferably used as the organic solvent. The method for cleaning with the organic solvent includes, for example, a method in which a polyarylene sulfide resin is immersed in the organic solvent, and it is also possible to appropriately perform stirring or heating, if necessary. The cleaning temperature is preferably normal temperature to 150° C. The polyarylene sulfide cleaned with the organic solvent is preferably cleaned several times with water or warm water to remove the remaining organic solvent. When the polyarylene sulfide is treated with hot water, water to be used is preferably distilled water or deionized water. The operation of a hot water treatment is usually performed by introducing a predetermined amount of the polyarylene sulfide into a predetermined amount of water, followed by heating with stirring under normal pressure or in a pressure vessel. A ratio of the polyarylene sulfide resin to water to be used is preferably a bath ratio of 200 g or less of the polyarylene sulfide to 1 liter of water. Specific method for performing an acid treatment of the polyarylene sulfide, includes, for example, a method in which a polyarylene sulfide resin is immersed in an acid or an aqueous solution of the acid, and it is also possible to appropriately perform stirring or heating, if necessary. Acetic acid or hydrochloric acid is preferably used as the acid. The polyarylene sulfide subjected to the acid treatment is preferably cleaned several times with water or warm water to remove the remaining acid or base. Water to be used for cleaning is preferably distilled water or deionized water.

A melt viscosity of the polyarylene sulfide is preferably 80 Pa·s or less, and more preferably 20 Pa·s or less, under the conditions of the temperature of 310° C. and a shear rate of 1,000/second. The lower limit of the melt viscosity is not particularly limited, and is preferably 5 Pa·s or more. Two or more polyarylene sulfides each having different melt viscosity may be used in combination. The melt viscosity can be measured under the conditions of a die length of 10 mm and a die orifice diameter of 0.5 to 1.0 mm using Capirograph (manufactured by Toyo Seiki Seisaku-sho, Ltd.).

The cellulose derivatives include, for example, cellulose acetate, cellulose acetate butyrate, ethyl cellulose and the like. Two or more cellulose derivatives may be included.

Of these thermoplastic resins, a resin selected from a polyamide resin, a styrene-based resin, a polycarbonate resin, a polyester resin and a polyarylene sulfide resin is preferable since it is excellent in moldability because of its excellent affinity with the fibrous filler (C), thus enabling further improvement in mechanical properties and surface appearance of the molded article. Of these, nylon 6, nylon 66, nylon 610, nylon 9T, ABS (acrylonitrile/butadiene/styrene copolymer), polycarbonate, polybutylene terephthalate, polyphenylene sulfide and the like can be more preferably used.

A melting point of the thermoplastic resin (A) is preferably 150° C. or higher and lower than 300° C. If the melting point is 150° C. or higher, it is possible to improve the heat resistance of the resin composition. Meanwhile, if the melting point is lower than 300° C., it is possible to appropriately suppress a processing temperature during the production of the resin composition to thereby suppress thermal decomposition of the polyrotaxane (B).

The melting point of the thermoplastic resin (A) of the present invention is defined as a temperature of an endothermic peak which appears when the temperature of the thermoplastic resin (A) is decreased to 30° C. from a molten state in an inert gas atmosphere at a temperature decrease rate of 20° C./minute, and then increased at a temperature increase rate of 20° C./minute, using a differential scanning calorimeter. The temperature is preferably increased to the melting point+40° C. When two or more endothermic peaks are detected, a temperature of an endothermic peak having the largest peak intensity is defined as the melting point.

The resin composition of the present invention is obtained by mixing a polyrotaxane (B) whose cyclic molecule is modified with a graft chain having a reactive functional group at the end. A rotaxane commonly means a molecule having a shape in which a linear molecule having a bulky blocking group at both ends passes through a cyclic molecule as mentioned; for example, in Harada, A., Li, J. & Kamachi, M., Nature 356, 325-327. When plural cyclic molecules are passed through by one linear molecule, it is referred to as a polyrotaxane.

The polyrotaxane is composed of a linear molecule and plural cyclic molecules and has a structure in which the linear molecule passes through the opening part of plural cyclic molecules, and also has a bulky blocking group at both ends of the linear molecule so as not to allow eliminating the cyclic molecule from the linear molecule. In the polyrotaxane, the cyclic molecule has a structure which enables free movement on the linear molecule, but does not enable the elimination from the linear molecule due to the blocking group. Namely, the linear molecule and the cyclic molecule have a structure capable of maintaining a form by a mechanical bond, not a chemical bond. Such a polyrotaxane has the effect of reducing stress from the exterior and stress remaining inside since the cyclic molecule has high mobility. Furthermore, mixing of a polyrotaxane whose cyclic molecule is modified with a graft chain having a specific functional group at the end with the thermoplastic resin (A) enables exertion of the similar effect on the thermoplastic resin (A).

The linear molecule is not particularly limited as long as it is a molecule which passes through the opening part of the cyclic molecule, and also has a functional group capable of reacting with the blocking group. Examples of the linear molecule, which is preferably used, include polyalkylene glycols such as polyethylene glycol, polypropylene glycol, and polytetramethylene glycol; hydroxyl group-terminated polyolefins such as polybutadiene diol, polyisoprene diol, polyisobutylene diol, poly(acrylonitrile-butadiene) diol, hydrogenated polybutadiene diol, polyethylene diol, and polypropylene diol; polyesters such as polycaprolactone diol, polylactic acid, polyethylene adipate, polybutylene adipate, polyethylene terephthalate, and polybutylene terephthalate; terminal functional polysiloxanes such as silanol-terminated polydimethylsiloxane; amino group-terminated chain polymers such as amino group-terminated polyethylene glycol, amino group-terminated polypropylene glycol, and amino group-terminated polybutadiene; and polyfunctional chain polymers having three or more functional groups capable of reacting with the blocking group in one molecule. Of these linear molecules, polyethylene glycol and/or amino group-terminated polyethylene glycol is/are preferably used in view of the fact that it is easy to synthesize the polyrotaxane.

A number average molecular weight of the linear molecule is preferably 2,000 or more, thus making it possible to improve the rigidity. The number average molecular weight is more preferably 10,000 or more. Meanwhile, the number average molecular weight is preferably 100,000 or less and it is possible to improve compatibility with the thermoplastic resin (A) and to refine a phase-separated structure, thus enabling further improvement in toughness. The number average molecular weight is more preferably 50,000 or less. Here, the number average molecular weight of the linear molecule means a value in terms of poly(methyl methacrylate), measured by gel permeation chromatography in which hexafluoroisopropanol is used as a solvent and Shodex HFIP-806M (two columns)+HFIP-LG are used as columns.

The blocking group is capable of linking to a terminal functional group of the linear molecule, and is not particularly limited as long as it is a sufficiently bulky group so as not to allow eliminating the cyclic molecule from the linear molecule. Examples of the blocking group, which is preferably used, include a dinitrophenyl group, a cyclodextrin group, an adamantyl group, a trityl group, a fluoresceinyl group, a pyrenyl group, an anthracenyl group, a main chain or a side chain of a polymer having a number average molecular weight of 1,000 to 1,000,000, and the like. Of these, two or more blocking groups may be used.

The cyclic molecule is not particularly limited as long as the linear molecule can pass through the opening part thereof. Examples of the cyclic molecule, which is preferably used, include cyclodextrins, crown ethers, cryptands, large cyclic amines, calixarenes, cyclophanes, and the like. Cyclodextrins are cyclic compounds of plural glucoses linked through an α-1,4-bond. A compound selected from α-cyclodextrin, β-cyclodextrin, and γ-cyclodextrin is more preferably used.

The polyrotaxane (B) is a polyrotaxane whose cyclic molecule is modified with a graft chain having a reactive functional group at the end. Therefore, modification of the cyclic molecule with the graft chain having a functional group makes compatibility of the polyrotaxane (B) with the thermoplastic resin (A) and affinity with an interface of the fibrous filler (C) satisfactory. As a result, it is possible to improve the toughness while maintaining the rigidity of the thermoplastic resin (A), thus enabling an improvement in rigidity and toughness with a good balance.

A resin composition having a high rigidity can be commonly obtained by mixing the thermoplastic resin (A) with the fibrous filler (C). However, such a resin composition has high rigidity, but has a problem that it exhibits brittle fracture. Meanwhile, a resin composition having high toughness can be commonly obtained by mixing the thermoplastic resin (A) with an elastomer. However, such a resin composition has high toughness and exhibits ductile fracture, but exhibits low rigidity. Namely, it was impossible for the prior art to obtain a fiber-reinforced plastic material that exhibits ductile fracture morphology while maintaining high rigidity. According to the resin composition of the present invention, it is possible to obtain a fiber-reinforced plastic material that has very high toughness and exhibits ductile fracture, regardless of having high rigidity.

The reactive functional group of the graft chain end is not particularly limited and includes, for example, at least one group selected from a hydroxyl group, an amino group, a carboxyl group, an acid anhydride group, a glycidyl group, an isocyanate group, an isothiocyanate group, a thiol group, an oxazoline group, a sulfonic acid group and the like.

It is preferred that the graft chain is composed of a polyester. In view of compatibility with the thermoplastic resin (A) and solubility in the organic solvent, an aliphatic polyester is more preferable. Examples of the aliphatic polyester include polylactic acid, polyglycolic acid, poly(3-hydroxybutyrate), poly(4-hydroxybutyrate), poly(3-hydroxybutyrate/3-hydroxyvalerate), poly(ε-caprolactone), and the like. Of these, poly(ε-caprolactone) is more preferable from the viewpoint of compatibility with the thermoplastic resin (A).

A mixing amount of the polyrotaxane (B) in the resin composition of the present invention is 0.1 part by weight or more and 20 parts by weight or less relative to 100 parts by weight of the total amount of thermoplastic resin (A) and the polyrotaxane (B). If the mixing amount of the polyrotaxane (B) is 0.1 part by weight or more, the stress relaxation effect of the polyrotaxane (B) is sufficiently exerted, leading to an improvement in toughness of the molded article. The mixing amount of the polyrotaxane (B) is preferably 0.5 part by weight or more. Meanwhile, if the mixing amount of the polyrotaxane (B) is 20 parts by weight or less, it is possible to maintain the rigidity and the heat resistance of the obtained molded article. The mixing amount of the polyrotaxane (B) is preferably 15 parts by weight or less, and more preferably 10 parts by weight or less.

In the polyrotaxane (B), the concentration of functional group at the end of the graft chain of the polyrotaxane (B) is preferably $2 \times 10^{-5}$ mol/g or more and $5 \times 10^{-4}$ mol/g or less. The adjustment of the concentration of functional group to $2 \times 10^{-5}$ mol/g or more enables an improvement in compatibility with the thermoplastic resin (A). As a result, the toughness can be further improved while maintaining the rigidity of the thermoplastic resin (A), thus enabling an improvement in rigidity and toughness with a good balance. The concentration of functional group is more preferably $3 \times 10^{-5}$ mol/g or more. Meanwhile, the adjustment of the concentration of functional group to $5 \times 10^{-4}$ mol/g or less enables suppression of aggregation due to association between functional groups of the polyrotaxane (B) and excessive chemical crosslinking with the thermoplastic resin (A), and suppression of the generation of aggregates and gel, thus enabling further improvement in toughness. The concentration of functional group is more preferably $1 \times 10^{-4}$ mol/g or less.

The concentration of functional group at the end of the graft chain of the polyrotaxane (B) can be determined by titration. For example, when the functional group of the graft chain end is a carboxyl group, the carboxyl group concentration can be determined by the following method. Using a vacuum dryer at 80° C., an absolutely dried sample is produced by drying the polyrotaxane (B) for 10 hours or more. With respect to a solution obtained by dissolving 0.2 g of the absolutely dried sample in 25 ml of benzyl alcohol, a carboxyl group concentration can be determined by titration using an ethanol solution of potassium hydroxide having a concentration of 0.02 mol/L. With respect to other functional groups, the concentration of functional group can be calculated by a known method.

By reacting a polyrotaxane whose cyclic molecule is modified with a graft chain with an introductory compound which has a desired functional group and is also capable of reacting with a graft chain end, the functional group of the graft chain end can be imparted. In this case, it is possible to adjust the concentration of functional group at the end of the graft chain within a desired range by adjusting a charge ratio of the polyrotaxane whose cyclic molecule is modified with a graft chain and the introductory compound.

The weight average molecular weight of the polyrotaxane (B) is preferably 100,000 or more, and it is possible to further improve the rigidity and the toughness. Meanwhile, the weight average molecular weight of the polyrotaxane (B) is preferably 1,000,000 or less, and the compatibility with the thermoplastic resin (A) is improved, thus enabling further improvement in toughness. The weight average molecular weight of the polyrotaxane (B) means a value in terms of poly(methyl methacrylate), measured by gel permeation chromatography in which hexafluoroisopropanol is used as a solvent and Shodex HFIP-806M (two columns)+ HFIP-LG are used as columns.

The resin composition of the present invention includes a fibrous filler (C). By including the fibrous filler (C), it is possible to obtain a molded article having excellent dimensional stability, in addition to excellent mechanical properties such as strength and rigidity.

It is also possible to use, as the fibrous filler (C), any filler having a fibrous shape. Specific examples thereof include glass fiber; polyacrylonitrile (PAN)-based and pitch-based carbon fibers; metal fibers such as stainless steel fiber, aluminum fiber and brass fiber; organic fibers such as polyester fiber and aromatic polyamide fiber; fibrous or whisker-like filler, such as gypsum fiber, ceramic fiber, asbestos fiber, zirconia fiber, alumina fiber, silica fiber, titanium oxide fiber, silicon carbide fiber, rock wool, potassium titanate whisker, silicon nitride whisker, wollastonite and alumina silicate; and glass fibers coated with one or more metals selected from the group consisting of nickel, copper, cobalt, silver, aluminum, iron and alloys thereof. Two or more thereof may be included.

Of these fibrous fillers, fibrous fillers selected from glass fiber, carbon fiber, stainless steel fiber, aluminum fiber and aromatic polyamide fiber are preferably used from the viewpoint of improving the strength, the rigidity and the surface appearance of the molded article. In view of the fact that a resin composition excellent in balance between mechanical properties such as rigidity and strength of the molded article and the fluidity of the resin composition is obtained, at least one fibrous filler selected from glass fiber and carbon fiber is particularly preferably used.

It is also possible to use those obtained by coating a surface of the fibrous filler (C) with a coupling agent, a sizing agent and the like. Coating with the coupling agent, the sizing agent and the like enables an improvement in wettability of the thermoplastic resin (A) and handling property of the fibrous filler (C). The coupling agent includes, for example, amino-based, epoxy-based, chloro-based, mercapto-based and cation-based silane coupling agents. An amino-based silane-based coupling agent is particularly suitably usable. The sizing agent includes, for example, sizing agents including a compound selected from carboxylic acid-based compounds, maleic anhydride-based compounds, urethane-based compounds, acrylic compounds, epoxy-based compounds, phenol-based compounds and these derivatives thereof.

The content of the fibrous filler (C) in the resin composition of the present invention is 1 to 200 parts by weight relative to 100 parts by weight of the total amount of the thermoplastic resin (A) and the polyrotaxane (B). If the content of the fibrous filler (C) is less than 1 part by weight; it is impossible to obtain the effect of improving mechanical properties and dimensional stability of the molded article. The content of the fibrous filler (C) is more preferably 10 parts by weight or more, and still more preferably 20 parts by weight or more. Meanwhile, if the content of the fibrous filler (C) exceeds 200 parts by weight, lifting of the fibrous filler (C) to a surface of the molded article, thus failing to obtain a molded article excellent in surface appearance. The content of the fibrous filler (C) is more preferably 175 parts by weight or less; and still more preferably 150 parts by weight or less.

When a test piece in conformity with ISO527-1:2012 is formed using the resin composition of the present invention and tensile properties of the test piece are measured by the method in conformity with ISO527-1:2012, a number average length of the exposed portion of the fibrous filler in a fracture surface of the test piece (hereinafter sometimes referred to as exposed fiber length) is preferably 0.1 mm or more after the measurement. The exposed fiber length is more preferably 0.2 mm or more, and still more preferably 0.25 mm or more. The exposed fiber length is preferably 1 mm or less. It is not preferable that the exposed fiber length is less than 0.1 mm since the toughness of the molded article deteriorates. Meanwhile, it is preferable that the exposed fiber length is 0.1 mm or more since the toughness is improved by extraction of the fibrous filler. When the molded article undergoes deformation, extraction of the fibrous filler occurs, thereby causing relaxation of stress applied to a matrix resin, and thus the toughness is improved. The method for controlling the exposed fiber length within the above range includes a method in which a mixing ratio of the thermoplastic resin (A), the polyrotaxane (B) and the fibrous filler (C) is adjusted within the above-mentioned preferable range and, in the case of producing a resin composition, extrusion conditions are adjusted to the below-mentioned preferable conditions using a twin-screw extruder.

The above-mentioned exposed fiber length can be determined by the following method. In a tensile test, a fracture surface of a test piece after fracture is observed by an optical microscope (50 to 1,000 times). Each length of 1,000 fibrous fillers selected at random from fibrous fillers exposed from the fracture surface of the molded article is measured and a number average thereof is regarded as an exposed fiber length. If the fracture surface in the molded article is not a flat surface, the exposed fiber length is calculated by specifying the fracture surface for each of selected fibrous filler.

When a test piece in conformity with ISO178:2010 is formed using the resin composition of the present invention and bending properties of the test piece are measured by the method in conformity with ISO178:2010, it is preferable that an elastic modulus is 3 GPa or more and the test piece causes no fracture even after exceeding the yield point. The elastic modulus is more preferably 5 GPa or more. The elastic modulus is preferably 100 GPa or less. It is not preferable that a bending elastic modulus is less than 3 GPa since deflection or deformation may occur when a large molded article is formed.

It is preferable that the resin composition of the present invention causes no fracture in a bending test performed by the method in conformity with ISO178:2010. "No fracture" in the present invention means that a test piece is not fractured even after exceeding the yield point in a bending test performed by the method in conformity with ISO178: 2010. The molded article made of the resin composition of the present invention simultaneously satisfies that the bending elastic modulus is 3 GPa or more and no fracture occurs in a bending test, and is suitably used in applications such as a large molded article and a shock absorbing member. The method for controlling the elastic modulus within the above range includes a method in which a mixing ratio of the thermoplastic resin (A), the polyrotaxane (B) and the fibrous filler (C) is adjusted within the above-mentioned preferable range.

The resin composition of the present invention can include an elastomer as long as the object of the present invention is not impaired. The elastomer includes, for example, a natural rubber, a silicone rubber, a fluororubber, a thermoplastic elastomer, a core-shell rubber, an ionomer and the like. Of these elastomers, an elastomer selected from a thermoplastic elastomer and a core-shell rubber is preferably used and a thermoplastic elastomer is more preferably used, from the viewpoint of the compatibility with the thermoplastic resin (A). When the thermoplastic elastomer is used as the elastomer, the thermoplastic elastomer is also included as the thermoplastic resin (A) in calculation of the content ratio of each component in the resin composition.

The thermoplastic elastomer commonly refers to a polymer having a glass transition temperature lower than room temperature wherein part of the molecules are restrained by each other through ionic bond, van der Waals force entanglement of molecular chains and the like. Examples thereof include polybutadiene; polyisoprene; random copolymers and block copolymers of styrene-butadiene; aforementioned polymers that are hydrogenated; styrene-ethylene-butylene-styrene block copolymers; aforementioned polymers that are hydrogenated; styrene-isoprene-butylene-styrene block copolymers; aforementioned polymers that are hydrogenated; diene-based rubbers such as acrylonitrile-butadiene copolymer and butadiene-isoprene copolymer; random copolymers and block copolymers of ethylene-propylene; random copolymers and block copolymers of ethylene-butene; copolymers of ethylene and α-olefin; ethylene-unsaturated carboxylate copolymers such as ethylene-acrylate and ethylene-methacrylate; acrylate-based elastic polymers such as acrylate-butadiene copolymer and butyl acrylate-butadiene copolymer; copolymers of ethylene and fatty acid vinyl, such as ethylene-vinyl acetate; ethylene-propylene-nonconjugated diene ternary copolymers such as ethylene-propylene-ethylidene norbornene copolymer and ethylene-propylene-hexadiene copolymer; butylene-isoprene copolymers, chlorinated polyethylene, polyamide elastomer, and polyester elastomer.

The core-shell rubber refers to a multilayered structure composed of at least one layer made of a rubber and one or more layers constituted of a polymer which is different from the rubber. The number of layers constituting the multilayered structure may be two or more, or may be three or more or four or more, and the core-shell rubber preferably includes one or more core layers having rubber elasticity inside. The type of the rubber constituting the core layer of the multilayered structure is not particularly limited, and examples of the rubber include rubbers obtained by polymerizing a component selected from an acrylate component, a silicone component, a styrene component, a nitrile component, a conjugated diene component, a urethane component, an ethylene component, a propylene component, an isobutene component and the like. The type of different polymer constituting the layer other than the rubber layer of the multilayered structure is not particularly limited as long as it is a polymer having thermoplasticity, and a polymer having a glass transition temperature higher than that of the rubber layer is preferable. The polymer having thermoplasticity includes, for example, polymers including a unit selected from an unsaturated carboxylic acid alkyl ester unit, an unsaturated carboxylic acid unit, an unsaturated glycidyl group-containing unit, an unsaturated acid anhydride unit; an aliphatic vinyl unit, an aromatic vinyl unit, a vinyl cyanide unit, a maleimide unit, an unsaturated dicarboxylic acid unit and other vinyl units.

The elastomer may be modified with a reactive functional group. The reactive functional group includes, for example, at least one group selected from an amino group, a carboxyl group, a hydroxyl group, an acid anhydride group, a glycidyl group, an isocyanate group, an isothiocyanate group, a mercapto group, an oxazoline group, a sulfonic acid group and the like. Of these groups; a group selected from an amino group, a carboxyl group, a glycidyl group, an acid anhydride group and an isocyanate group is preferably used, and a group selected from a glycidyl group, an acid anhydride group and an isocyanate group is more preferably used, from the viewpoint of simplicity of introduction of the functional group and reactivity. When the functional group is introduced into the elastomer, the method is not particularly limited. For example, when an acid anhydride group is introduced into a thermoplastic elastomer, it is possible to use a method in which a monomer having an acid anhydride group is copolymerized with a monomer that is a raw material of the thermoplastic elastomer, a method in which acid anhydride is grafted with the thermoplastic elastomer and the like.

The resin composition of the present invention can further include nonfibrous fillers, various additives and the like as long as the object of the present invention is not impaired.

Examples of the nonfibrous filler include: nonswellable silicates such as talc, wollastonite, zeolite, sericite, mica, kaolin, clay, pyrophyllite, bentonite, asbestos, alumina silicate, and calcium silicate; swellable lamellar silicates including swellable micas such as Li-type fluorine taeniolite, Na-type fluorine taeniolite, Na-type fluorine tetrasilicon mica, and Li-type fluorine tetrasilicon mica; metal oxides such as silicon oxide, magnesium oxide, alumina, silica, diatomite, zirconium oxide, titanium oxide, iron oxide, zinc oxide, calcium oxide, tin oxide, and antimony oxide; metal carbonates such as calcium carbonate, magnesium carbonate, zinc carbonate, barium carbonate, dolomite, and hydrotalcite; metal sulfates such as calcium sulfate and barium sulfate; metal hydroxides such as magnesium hydroxide, calcium hydroxide, aluminum hydroxide, and basic magnesium carbonate; smectite clay minerals such as montmorillonite, beidellite, nontronite, saponite, hectorite, and sauconite; various clay minerals such as vermiculite, halloysite, kanemite, kenyaite, zirconium phosphate, and titanium phosphate; glass beads, glass flakes, ceramic beads, boron nitride, aluminum nitride, silicon carbide, calcium phosphate, carbon black, and graphite. The above swellable lamellar silicate may have the exchangeable cation located between layers exchanged with organic onium ion.

Examples of the organic onium ion include ammonium ion, phosphonium ion, or sulfonium ion.

Specific examples of various additives include: heat stabilizers; coupling agents such as isocyanate-based compounds, organic silane-based compounds, organic titanate-based compounds, organic borane-based compounds, and epoxy compounds; plasticizers such as polyalkylene oxide oligomer-based compounds, thioether-based compounds, ester-based compounds, and organic phosphorous-based compounds; crystal nucleating agents such as organic phosphorous compounds and polyether ether ketones; metal soaps such as montanic acid waxes, lithium stearate, and aluminum stearate; mold release agents such as ethylenediamine-stearic acid-sebacic acid polycondensates, and silicone-based compounds; coloring-preventing agents such as hypophosphites; lubricants; ultraviolet protective agents; coloring agents; flame retardants; and foaming agents. When containing these additives, the content thereof is preferably 10 parts by weight or less, and more preferably 1 part by weight or less, relative to 100 parts by weight of the thermoplastic resin (A) so as to sufficiently make use of the feature of the thermoplastic resin (A).

Examples of the heat stabilizer include phenol-based compounds such as N,N'-hexamethylenebis(3,5-di-t-butyl-4-hydroxy-hydrocinnamide) and tetrakis[methylene-3-(3', 5'-di-t-butyl-4'-hydroxyphenyl)propionate]methane; phosphorus-based compounds; sulfur-based compounds such as mercaptobenzimidazole-based compounds, dithiocarbamic acid-based compounds, and organic thio acid-based compounds; and amine-based compounds such as N,N'-di-2-naphthyl-p-phenylenediamine and 4,4'-bis($\alpha,\alpha$-dimethylbenzyl)diphenylamine. Of these, two or more heat stabilizers may be contained.

Examples of the method for producing a resin composition of the present invention include, but are not limited to, a method of kneading raw materials in a molten state, a method of mixing in a solution state, and the like. In view of an improvement in reactivity, the method of kneading in a molten state is preferable. Examples of the melt kneader for kneading in a molten state include a single-screw extruder, a multiple-screw extruder such as a twin-screw extruder or a quad-screw extruder, an extruder such as a twin-screw/single-screw composite extruder, a kneader, and the like. In view of productivity, an extruder capable of continuously producing is preferable. In view of improvement in kneadability, reactivity, and productivity, a twin-screw extruder is more preferable.

Taking the case of producing a resin composition of the present invention using a twin-screw extruder as an example, a description will be made. From the viewpoint of suppressing thermal deterioration of the polyrotaxane (B) to thereby further improve the toughness, a maximum resin temperature in the melt kneading step is preferably 300° C. or lower. Meanwhile, the maximum resin temperature is preferably a melting point of the thermoplastic resin (A) or higher. Here, the maximum resin temperature means the highest temperature of temperatures measured by resin thermometers arranged at equal interval, in plural positions of the extruder.

Regarding a ratio of an extrusion amount of the resin composition in the melt kneading step and a screw rotation speed, the extrusion amount is preferably 0.01 kg/h or more, and more preferably 0.05 kg/h or more, per 1 rpm of screw rotation speed, from the viewpoint of suppressing thermal deterioration of the thermoplastic resin (A) and the polyrotaxane (B). Meanwhile, the extrusion amount is preferably 1 kg/h or less per 1 rpm of screw rotation speed from the viewpoint of further promoting a reaction between the thermoplastic resin (A) and the polyrotaxane (B) resin. The extrusion amount means the weight (kg) of the resin composition to be ejected from the extruder per 1 hour. The extrusion amount per 1 rpm of the screw speed means a value obtained by dividing the extrusion amount by the screw speed.

In this way, the resin composition thus obtained can be molded by a known method, thus making it possible to obtain various molded articles such as sheets and films. Examples of the molding method include an injection molding method, an injection compression molding method, an extrusion molding method, a compression molding method, a blow molding method, a press molding method, and the like.

The resin composition of the present invention and molded articles thereof can be used in various applications such as automobile components, electric and electronic components, construction components, various containers, commodities, household articles, and sanitary articles, by making use of excellent properties. The resin composition of the present invention and molded articles thereof are particularly preferably used in applications which need to have toughness and rigidity, such as automobile exterior components, automobile electrical components, automobile under-hood components, automobile gear components, and electric and electronic components such as housing, connector, and reflector. Specifically, suitable applications thereof include automobile engine peripheral components such as engine cover, air intake pipe, timing belt cover, intake manifold, filler cap, throttle body, and cooling fan; automobile under-hood components such as cooling fan, top and base of radiator tank, cylinder head cover, oil pan, brake piping, tube for fuel piping, and exhaust gas system components; automobile gear components Such as gear, actuator, bearing retainer, bearing cage, chain guide, and chain tensioner; automobile interior components such as shift lever bracket, steering lock bracket, key cylinder, door inner handle, door handle cowl, rear-view mirror bracket, air conditioner switch, instrument panel, console box, glove compartment, steering wheel, and trim; automobile exterior components such as front fender, rear fender, fuel lid, door panel, cylinder head cover, door mirror stay, tail gate panel, license garnish, roof rail, engine mount bracket, rear garnish, rear spoiler, trunk lid, rocker molding, molding, lamp housing, front grill, mud guard, and side bumper; air intake and exhaust system components such as air intake manifold, intercooler inlet, exhaust pipe cover, inner bush, bearing retainer, engine mount, engine head cover, resonator, and throttle body; engine cooling water system components such as chain cover, thermostat housing, outlet pipe, radiator tank, alternator, and delivery pipe; automobile electric components such as connector, wire harness connector, motor component, lamp socket, in-vehicle sensor switch, and combination switch; and electric and electronic components such as SMT connector, socket, card connector, jack, power supply component, switch, sensor, capacitor seat plate, relay, resistor, fuse holder, coil bobbin, IC or LED housing, and reflector. Furthermore, a resin composition of the present invention and molded articles thereof can also be suitably used in sports application by making use of excellent properties such as high impact properties and causing no fracture, and can be suitably used as golf related goods such as golf club, shaft, grip and golf ball; racket related sports goods such as tennis racket, badminton racket, and their string; personal protective sports goods such as mask, helmet, chest protector, elbow pad, and knee pad for American football, baseball, and soft ball; wear related goods such as sportswear; shoe related goods such as soles of sports shoes; fishing related goods such as fishing pole and fishing line; summer sports related goods such as for surfing; winter sports related goods such as ski and snow board; and other indoor and outdoor sports related goods.

EXAMPLES

The present invention will be described by way of Examples, but the present invention is not limited to these Examples. To obtain a resin composition of each Example, the following raw materials were used.
<Thermoplastic Resin>
(A-1): Nylon 6 resin ("AMILAN" (registered trademark), manufactured by Toray Industries, Ltd.) $\eta_r$=2.70, melting point of 225° C., amide group concentration of 10.5 mmol/g.

Here, the above relative viscosity $\eta_r$ was measured at 25° C. in a 98% concentrated sulfuric acid solution having the concentration of 0.01 g/ml. The melting point was determined by the following procedure using a differential scanning calorimeter. In an inert gas atmosphere, the temperature of a polyamide was decreased to 30° C. from a molten state at a temperature decrease rate of 20° C./minute and the temperature was increased to 265° C. at a temperature rise rate of 20° C./minute, and then the temperature of an endothermic peak observed was regarded as the melting point. When two or more endothermic peaks were observed, the temperature of the endothermic peak having the largest peak intensity was regarded as the melting point. The amide group concentration was calculated from a structural formula of a structural unit using the following equation (1).

Amide group concentration (mol/g)=(number of amide groups of structural unit/molecular weight of structural unit)      (1).

(A-2): Polybutylene terephthalate resin ("TORAYCON" (registered trademark), manufactured by Toray Industries, Ltd.), $\eta$=0.85 dl/g (measured at 25° C. in an o-chlorophenol solution), melting point of 223° C.

An intrinsic viscosity $\eta$ was measured at 25° C. in an o-chlorophenol solution having the concentration adjusted to 0.5% by weight. The melting point was defined as a temperature of an endothermic peak which appears when the temperature of polybutylene terephthalate is decreased to 30° C. from a molten state in an inert gas atmosphere at a temperature decrease rate of 20° C./minute, and then increased to 263° C. at a temperature increase rate of 20° C./minute, using a differential scanning calorimeter. When two or more endothermic peaks are detected, a temperature of an endothermic peak having the largest peak intensity was defined as the melting point.
(A-3): Nylon 66 resin ("AMILAN" (registered trademark), manufactured by Toray Industries, Ltd.), $\eta_r$=2.78, melting point of 260° C., amide group concentration of 8.84 mmol/g.
(A-4): Nylon 610 resin ("AMILAN" (registered trademark), manufactured by Toray Industries, Ltd.), $\eta_r$=2.71, melting point of 223° C., amide group concentration of 7.08 mmol/g.
<Polyrotaxane>
(B-1): Polyrotaxane ("SeRM" (registered trademark) Super Polymer SH2400P, manufactured by Advanced Softmaterials Inc.) was used. The end group of a graft chain modifying a cyclic molecule of this polyrotaxane is a hydroxyl group, a hydroxyl value in conformity with JIS K0070 is $1.35\times10^{-3}$ mol/g, a number average molecular weight of polyethyleneglycol as a linear molecule is 20,000, and an entire weight average molecular weight is 400,000.

The weight average molecular weight of the polyrotaxane means a value in terms of poly(methyl methacrylate), measured by gel permeation chromatography in which hexafluoroisopropanol is used as a solvent and Shodex HFIP-806M (two columns)+HFIP-LG are used as columns.
<Fibrous Filler>
(C-1): Glass fiber (T-249, manufactured by Nippon Electric Glass Co., Ltd.) was used.
(C-2): Glass fiber (T-253, manufactured by Nippon Electric Glass Co., Ltd.) was used.
<Other Components>
(D-1): Maleic anhydride-modified ethylene-butene copolymer "TAFMER" (registered trademark) MH5040, manufactured by Mitsui Chemicals, Inc.) was used. The functional group concentration is $3.2\times10^{-4}$ mol/g.
<Evaluation Methods>

A description will be made on evaluation methods in the respective Examples and Comparative Examples. Unless otherwise specified, the number of samples to be evaluated (n) was 5 and an average was determined.
(1) Rigidity (Bending Elastic Modulus)

Pellets obtained by the respective Examples and Comparative Examples were vacuum-dried at 80° C. for 12 hours and then injection-molded under the conditions shown in Tables 1 and 2 using an injection molding machine (SE75DUZ-C250, manufactured by Sumitomo Heavy Industries, Ltd.) to fabricate multi-purpose test, pieces in conformity with ISO178:2010. With respect to bending test pieces obtained from these multi-purpose test pieces, a bending test was performed at a crosshead speed of 2 mm/min in accordance with ISO178:2010 using a precision universal testing machine AG-20 kNX (manufactured by Shimadzu Corporation) and then a bending elastic modulus was determined.
(2) Bending Fracture Behavior In the above-mentioned bending test, the case where the test piece causes no fracture even after exceeding the yield point was rated "no fracture", while the case where the test piece is fractured before exceeding the yield point was rated "fracture".
(3) Toughness (Tensile Elongation at Break)

Pellets obtained by the respective Examples and Comparative Examples were vacuum-dried at 80° C. for 12 hours and then injection-molded under the conditions shown in Tables 1 and 2 using an injection molding machine (SE75DUZ-C250, manufactured by Sumitomo Heavy Industries, Ltd.) to fabricate 1A-type multi-purpose test pieces in conformity with ISO527-1:2012. With respect to tensile test pieces obtained from these multi-purpose test pieces, a tensile test was performed at a tensile speed of 5 mm/min and a gauge length of 75 mm in accordance with ISO527-1:2012 using a precision universal testing machine AG-20 kNX (manufactured by Shimadzu Corporation) and then a tensile elongation at break was determined.
(4) Number Average Length of Exposed Portion of Fibrous Filler (Exposed Fiber Length)

The fracture surface of the test piece after fracture in the above-mentioned tensile test was observed using an optical microscope (50 to 1,000 times). Each length of 1,000 fibrous fillers selected at random from fibrous fillers exposed from the fracture surface of the molded article was measured and a number average thereof was regarded as an exposed fiber length. If the fracture surface in the molded article is not a flat surface, the exposed fiber length is calculated by specifying the fracture surface for each of selected fibrous filler.

Examples 1 to 9, Comparative Examples 1 to 9

A thermoplastic resin (A), a polyrotaxane (B) and, if necessary, an elastomer (D) were mixed so as to obtain the composition shown in Tables 1 and 2, followed by preblending. Using a twin-screw extruder (TEX30α, manufactured by The Japan Steel Works, Ltd.) set at extrusion conditions shown in Tables 1 and 2, the thermoplastic resin (A), the polyrotaxane (B) and, if necessary, the elastomer (D) were fed through a main feeder and a fibrous filler (C) was fed through a side feeder, and then the gut ejected from the extruder was pelletized to obtain pellets. The thus obtained pellets were evaluated by the above methods. The results are shown in Tables 1 and 2.

TABLE 1

|  |  |  |  | Example 1 | Example 2 | Example 3 | Example 4 | Example 5 | Example 6 | Example 7 | Example 8 | Example 9 |
|---|---|---|---|---|---|---|---|---|---|---|---|---|
| Thermoplastic resin | A-1 | Nylon 6 | Parts by weight | 95 | 95 | 90 | 85 | 85 | 85 | — | — | — |
|  | A-2 | Polybutylene terephthalate | Parts by weight | — | — | — | — | — | — | 95 | — | — |
|  | A-3 | Nylon 66 | Parts by weight | — | — | — | — | — | — | — | 95 | — |
|  | A-4 | Nylon 610 | Parts by weight | — | — | — | — | — | — | — | — | 95 |
| Polyrotaxane | B-1 | SH2400P | Parts by weight | 5 | 5 | 5 | 10 | 10 | 10 | 5 | 5 | 5 |
| Fibrous filler | C-1 | Glass fiber (T-249) | Parts by weight | 42.85 | — | — | — | — | — | — | — | — |
|  | C-2 | Glass fiber (T-253) | Parts by weight | — | 42.85 | 42.85 | 42.85 | 53.85 | 66.67 | 42.85 | 42.85 | 42.85 |
| Elastomer | D-1 | MH5040 | Parts by weight | — | — | 5 | 5 | 5 | 5 | — | — | — |
| Extrusion conditions | Cylinder setting temperature | | °C. | 240 | 240 | 240 | 240 | 240 | 240 | 240 | 275 | 240 |
|  | Screw speed | | rpm | 100 | 100 | 100 | 100 | 100 | 100 | 100 | 100 | 100 |
| Molding conditions | Cylinder setting temperature | | °C. | 240 | 240 | 240 | 240 | 240 | 240 | 240 | 275 | 240 |
|  | Mold setting temperature | | °C. | 80 | 80 | 80 | 80 | 80 | 80 | 80 | 80 | 80 |
| Bending test | Bending elastic modulus | | GPa | 8.4 | 8.8 | 8.6 | 8.4 | 8.6 | 11.1 | 9.5 | 9.2 | 8.5 |
|  | Fracture morphology | |  | no fracture | no fracture | no fracture | no fracture | no fracture | no fracture | no fracture | no fracture | no fracture |
| Tensile test | Tensile elongation at break | | % | 5.6 | 6.2 | 9.4 | 18.1 | 12.0 | 6.6 | 4.3 | 5.2 | 7.2 |
|  | Exposed fiber length | | mm | 0.18 | 0.20 | 0.25 | 0.3 | 0.26 | 0.24 | 0.18 | 0.19 | 0.22 |

TABLE 2

|  |  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|---|
| Thermoplastic resin | A-1 | Nylon 6 | Parts by weight | 100 | 100 | — | — | 100 | — | — | — | — |
|  | A-2 | Polybutylene terephthalate | Parts by weight | — | — | 100 | 100 | — | — | — | — | — |
|  | A-3 | Nylon 66 | Parts by weight | — | — | — | — | — | 100 | 100 | — | — |
|  | A-4 | Nylon 610 | Parts by weight | — | — | — | — | — | — | — | 100 | 100 |
| Polyrotaxane | B-1 | SH2400P | Parts by weight | — | — | — | — | — | — | — | — | — |
| Fibrous filler | C-1 | Glass fiber (T-249) | Parts by weight | — | 42.85 | — | 42.85 | — | — | 42.85 | — | 42.85 |
|  | C-2 | Glass fiber (T-253) | Parts by weight | — | — | — | — | 42.85 | — | — | — | — |
| Elastomer | D-1 | MH5040 | Parts by weight | — | — | — | — | — | — | — | — | — |
| Extrusion conditions | Cylinder setting temperature | | °C. | 240 | 240 | 240 | 240 | 240 | 240 | 240 | 275 | 240 |
|  | Screw speed | | rpm | 100 | 100 | 100 | 100 | 100 | 100 | 100 | 100 | 100 |
| Molding conditions | Cylinder setting temperature | | °C. | 240 | 240 | 240 | 240 | 240 | 275 | 275 | 240 | 240 |
|  | Mold setting temperature | | °C. | 80 | 80 | 80 | 80 | 80 | 80 | 80 | 80 | 80 |
| Bending test | Bending elastic modulus | | GPa | 2.8 | 8.4 | 2.5 | 9.5 | 8.4 | 2.8 | 9.4 | 2.1 | 8.8 |
|  | Fracture morphology | |  | No fracture | Fracture | No fracture | Fracture | Fracture | No fracture | Fracture | No fracture | Fracture |
| Tensile test | Tensile elongation at break | | % | 35.0 | 4.5 | 30 | 2.5 | 4.6 | 24 | 2.5 | 50 | 2.9 |
|  | Exposed fiber length | | mm | — | 0.085 | — | 0.07 | 0.087 | — | 0.078 | — | 0.085 |

The invention claimed is:

1. A resin composition comprising:
a thermoplastic resin (A), a polyrotaxane (B) whose cyclic molecule is modified with a graft chain having a reactive functional group at the end, a fibrous filler (C), and an elastomer (D), which are mixed together,
wherein the thermoplastic resin (A) is a resin selected from a polyamide resin, a styrene-based resin, a polycarbonate resin, a polyester resin or a polyarylene sulfide resin, the reactive functional group at the end of the graft chain of the polyrotaxane (B) is at least one group selected from a hydroxyl group, an amino group, a carboxyl group, an acid anhydride group, a glycidyl group, an isocyanate group, an isothiocyanate group, a thiol group, an oxazoline group and a sulfonic acid group, and
the resin composition containing the fibrous filler (C) in an amount of 1 to 200 parts by weight relative to 100 parts by weight of a total amount of the thermoplastic resin (A) and the polyrotaxane (B),
wherein, when a test piece in conformity with ISO178:2010 is formed using the resin composition and bending properties of the test piece are measured by the method in conformity with ISO178:2010, an elastic modulus is 3 GPa or more and the test piece causes no fracture even after exceeding its yield point.

2. The resin composition according to claim 1, wherein, when a test piece in conformity with ISO527-1:2012 is formed using the resin composition and tensile properties of the test piece are measured by the method in conformity with ISO527-1:2012, a number average length of the exposed portion of the fibrous filler in a fracture surface of the test piece is 0.1 mm or more after the measurement.

3. The resin composition according to claim 1, wherein the fibrous filler (C) is at least one selected from the group consisting of a glass fiber and a carbon fiber.

4. A molded article comprising the resin composition according to claim 1.

* * * * *